United States Patent [19]

Stack et al.

[11] Patent Number: 5,634,672
[45] Date of Patent: Jun. 3, 1997

[54] FLANGELESS PIPE JOINT

[75] Inventors: Eugene V. Stack, Bay City; Michael F. Jeglic, Auburn, both of Mich.

[73] Assignee: The Dow Chemical Company, Midland, Mich.

[21] Appl. No.: 416,794

[22] PCT Filed: Nov. 23, 1992

[86] PCT No.: PCT/US92/10171

§ 371 Date: Apr. 12, 1995

§ 102(e) Date: Apr. 12, 1995

[87] PCT Pub. No.: WO94/12828

PCT Pub. Date: Jun. 9, 1994

[51] Int. Cl.⁶ .................................. F16L 11/12
[52] U.S. Cl. .................. 285/54; 285/55; 285/21.1; 285/286; 285/294; 285/297; 285/382.4; 285/383; 156/158; 156/165; 156/294; 264/269; 264/152
[58] Field of Search .................. 285/53, 54, 55, 285/48, 294, 297, 258, 382.4, 286, 21.1, 383; 156/158, 165, 294, 152; 264/269

[56] References Cited

U.S. PATENT DOCUMENTS

| | | | |
|---|---|---|---|
| 2,704,104 | 3/1955 | Mueller | 285/382.5 X |
| 2,977,633 | 4/1961 | Breitenstein | 285/55 X |
| 3,002,269 | 10/1961 | Hopkins | 285/382.5 X |
| 3,268,240 | 8/1966 | Gerner | 285/55 |
| 3,406,987 | 10/1968 | Hunder et al. | 285/22 |
| 3,441,294 | 4/1969 | Krieg | 285/55 |
| 3,508,766 | 4/1970 | Kessler et al. | 285/55 X |
| 3,561,795 | 2/1971 | Belher | 285/55 |
| 3,929,541 | 12/1975 | Spears et al. | 156/157 |
| 3,965,555 | 6/1976 | Webster et al. | 285/55 X |
| 3,989,281 | 11/1976 | Wilde | 285/294 X |
| 4,049,480 | 9/1977 | Kutschke | 156/94 |
| 4,127,287 | 11/1978 | Davies | 285/55 |
| 4,352,708 | 10/1982 | McElroy | 156/378 |
| 4,400,019 | 8/1983 | Frulk | 285/55 |
| 4,496,499 | 1/1985 | Brittain et al. | 264/36 |
| 4,537,425 | 8/1985 | Press et al. | 285/55 |
| 4,779,445 | 10/1988 | Rabe | 29/283.5 |
| 4,780,163 | 10/1988 | Haneline, Jr. et al. | 156/94 |
| 5,224,738 | 7/1993 | Taga | 285/55 X |
| 5,368,669 | 11/1994 | Maine et al. | 285/55 |

FOREIGN PATENT DOCUMENTS

| | | | |
|---|---|---|---|
| 1383155 | 11/1964 | France | 285/55 |
| 700234 | 1/1966 | Italy | 285/55 |

OTHER PUBLICATIONS

Lednicky, R., et al. "Reduce Leaks and Corrosion with Plastic-Lined Piping", Reprinted from *Chemical Engineering Progress*, Mar., 1991.

*Primary Examiner*—Dave W. Arola

[57] ABSTRACT

A flangeless pipe joint including lined pipes with the end section of the outer pipe spaced radially outwardly from the liner and insulating material filling the space between the end sections of pipe and liners. The ends of the liners are sealed to each other and the outer pipe ends are joined by an outer sleeve.

22 Claims, 4 Drawing Sheets

FLANGELESS PIPE JOINT

The subject invention pertains to a flangeless pipe joint. The subject invention further pertains to a process for manufacturing a flangeless pipe joint. The subject invention further pertains to an apparatus for bulging the end of a polymer-lined pipe. The subject invention further pertains to a process for bulging the end of a polymer-lined pipe.

Currently available and well known plastic-lined piping products comprise a family of pipes, fittings, and valves especially designed for handling corrosive or high purity liquids. Such products generally comprise steel lined with a polymeric material. Such materials include, but are not limited to polyvinylidene chloride, polypropylene, polyvinylidene fluoride, perfluoroalkoxy copolymer, fluorinated ethylene-propylene copolymer, ethylene trifluoroethylene, ethylchlorotrifluoroethylene, and polytetrafluoroethylene. Such products enjoy both the structural integrity of steel and the high chemical resistance characteristic of the selected polymeric liner.

Plastic-lined pipe typically falls into one of two categories: transfer pipe and process pipe. Transfer pipe refers to pipe typically located beneath the ground for the transfer of a material long distances, from one location to another. Transfer pipe is typically prepared by slip lining, wherein a polymeric liner is pulled through an installed pipe and retained within such pipe only at the points of joinder between adjacent pipe segments, each pipe segment being hundreds of feet long. Typically, the outside diameter of the liner is up to about 10 percent less than the inside diameter of the pipe segments, causing a significant gap between the liner and the inner wall of the pipe. As transfer pipe is not typically subjected to thermal cycling, the relatively large gap between the liner and the inner wall of the pipe is not problematic.

Process pipe typically falls into one of three subcategories: loose-lined pipe, interference fit pipe, and swaged pipe. In contrast to transfer pipe, process pipe typically comprises shorter pipe segments, on the order of about twenty feet and less. Further, process pipe is typically characterized by an outside liner diameter which is at least about 97 percent of the inside diameter of the pipe segments.

Loose-lined pipe is characterized by a polymeric liner retained within a pipe only at the points of joinder between adjacent pipe segments, wherein the outside liner diameter is at least about 97 percent of the inside diameter of the pipe segment. Loose-lined pipes are typically manufactured by slipping a pre-formed polymeric liner into a flanged pipe segment, flaring the liner over the structurally rigid flange face, and bolting the flange to an adjacent flange. In loose-lined pipe, the liner is thus retained within the pipe segment by the compressive force exerted on the flared portion of the liner at the flange face. Loose-lined pipe is generally sold as its components, e.g., as pipe segments, polymeric liners, and flanges. In the field, the liner may be inserted into the flanged pipe segment, and may be flared as described above. Suppliers for loose-lined pipe components include Crane-Resistoflex Co. (Marion, N.C.), and Performance Plastic Products (Houston, Tex.).

Interference fit pipe, which is also known as reverse swaged pipe, is characterized by a zero tolerance fit between the polymeric liner and the pipe segments. Interference fit plastic-lined pipe is typically formed by compressing a preformed polymeric liner having an outer diameter greater than the inner diameter of the pipe segment by passing it through a sizing die, and inserting the compressed liner into the pipe segment before the liner expands. Upon the release of the force by which the liner is pulled through the pipe, the memory of the plastic causes the liner to exert force upon the inner wall of the pipe segment, serving to assist in retaining the liner within the pipe segment. Due to the special apparatus required to achieve the interference fit relationship, interference fit pipe is generally available as pre-lined pipe segments. Interference fit pipe is sold by Crane-Resistoflex Co. (Marion, N.C.) as Thermal Locked pipe.

Swaged pipe is characterized by a zero tolerance fit between the polymeric liner and the pipe segments. Swaged pipe is typically formed by inserting a preformed polymeric liner into an oversized pipe segment and physically compressing both the pipe and the liner under tremendous pressure such that the liner and the pipe segment are reduced in size to the finished diameters. To further facilitate retention of the liner within the pipe segment, pipe segments to be lined may be "picked" to provide barbs and recessed portions into which the liner is directed during swaging. Due to the special apparatus required to swage pipe, swaged pipe is generally available as pre-lined pipe segments. Swaged pipe is sold by the Dow Chemical Company.

Metal and polymers have different rates of expansion under heat. Swaged pipe, and to some extent interference fit pipe, is advantageous as compared to loose-lined pipe when temperature changes within the piping are contemplated. Zero tolerance fit piping systems tend to better retain the liner in close proximity with the metal, thus limiting the extent of expansion and retraction of the liner during temperature cycling. This is particularly true in the case of swaged pipe having the "picked" surface described above, wherein the resultant inner locking secures the liner to the steel pipe segment over the entire length of the pipe segment, thereby evenly distributing the stresses caused by thermal expansion and contraction.

Due to the tendency of the polymer to deform under high temperatures, adjacent pipe segments are not typically joined by fusing adjacent liners and then welding adjacent pipe segments. Absent appropriate insulation, the metal-metal weld would destroy the integrity of the underlying liners. Thus, each pipe, fitting, valve, etc. will typically contain a flange at or substantially near each end thereof. Adjacent pipes, fittings, valves, etc., within a given pipeline may be joined one to another by the fastening together of such flanges, e.g., by bolting.

While flanged joints are acceptable in most applications, industries which utilize process piping would find advantage in flangeless joints. Such joints could be constructed to be fluid-proof and vapor-proof, to decrease (if not eliminate) fugitive emissions through the joints. Moreover, such joints would be less bulky than flanged joints, which would make their enclosure within secondary containment systems less unwieldy.

U.S. Pat. No. 4,780,163 provides a method of sliplining transfer pipe to form a pipeline having flangeless joints. In particular, a section of pipe is cut to form two pieces and a cutout portion, such that the point of the cut forms a closure point. Polymeric liner segments are then drawn through each of the two pieces and extend beyond the ends of the pipe to the closure point. Then, the liner segments are fused at the closure point, the liner segments are insulated at the point of fusion, and the cut out portion is welded to the pieces to form a continuous piece of pipe. The patent requires that a heat shield-insulation material be wrapped around the fused liner segments between the fused liner segments and the cutout portion of the pipe. Such heat shield-insulation material may be used due to the relatively large gap that exists between the outer surface of the liner and the inner surface of the pipe segment, characteristic of sliplined pipe. However, given that process piping is characterized by a very small space between the liner and the inner wall of the pipe, the patented process would be difficult, if not impossible, to apply to produce flangeless process pipe systems.

Industry would find advantage in flangeless joints for plastic-lined process pipe systems. In particular, the industry would find advantage in flangeless joints for plastic-lined process pipe systems, wherein the liner is loose-lined, interference fit, or swaged into the pipe segments.

Accordingly, the subject invention provides a flangeless pipe joint for polymer-lined pipe comprising:

(a) a first section of pipe in part defined by a first portion having a first inner diameter and a first bulged portion having a first bulged end, the first bulged end having a second inner diameter at the first bulged end, the second inner diameter being greater than the first inner diameter, the first section of pipe being lined with a first polymeric liner having a first polymeric liner end and first outer diameter such that the first outer diameter is at least about 97 percent of the first inner diameter, the first polymeric liner end extending beyond the first bulged end;

(b) a second section of pipe in part defined by a second portion having a third inner diameter and a second bulged portion having a second bulged end, the second bulged end having a fourth inner diameter, the fourth inner diameter being greater than the third inner diameter, the second section of pipe being lined with a second polymeric liner having a second polymeric liner end and a second outer diameter such that the second outer diameter is at least about 97 percent of the second inner diameter, the second polymeric liner end extending beyond the second bulged end;

(c) first joining means for joining the first polymeric liner end to the second polymeric liner end whereupon a first annular gap and a second annular gap are created, the first annular gap being defined by the first polymeric liner, the first bulged portion, and the joining means, and the second annular gap being defined by the second polymeric liner, the second bulged portion, and the joining means;

(d) insulating material substantially filling the first annular gap and the second annular gap;

(e) an annular collar portion which extends from the first bulged portion to the second bulged portion; and (f) second joining means for joining the annular collar portion to the first bulged portion and the second bulged portion.

The subject invention further provides a process for preparing a flangeless pipe joint for polymer-lined pipe comprising:

(a) providing a first section of pipe in part defined by a first portion having a first inner diameter, the first section of pipe being lined with a first polymeric liner having a first polymeric liner end and a first outer diameter such that the first outer diameter is at least about 97 percent of the first inner diameter;

(b) bulging the first section of pipe to form a first bulged portion having a first bulged end, the first bulged end having a second inner diameter, the second inner diameter being greater than the first inner diameter;

(c) cutting the first bulged portion exclusive of the first polymeric liner, whereupon the first polymeric liner end extends beyond the first bulged end;

(d) providing a second section of pipe in part defined by a portion having a third inner diameter, the second section of pipe being lined with a second polymeric liner having a second polymeric liner end and a second outer diameter such that the second outer diameter is at least about 97 percent of the third inner diameter;

(e) bulging the second section of pipe to form a second bulged portion having a second bulged end, the second bulged end having a fourth inner diameter, the fourth inner diameter being greater than the third inner diameter;

(f) cutting the second bulged portion exclusive of the second polymeric liner, whereupon the second polymeric liner end extends beyond the second bulged end;

(g) joining the first polymeric liner end to the second polymeric liner end, whereupon a first annular gap and a second annular gap are created, the first annular gap being defined by the first polymeric liner, the first bulged portion, and the joining means, and the second annular gap being defined by the second polymeric liner, the second bulged portion, and the joining means;

(h) filling the first annular gap and the second annular gap with insulating material;

(i) providing an annular collar portion which extends from the first bulged portion to the second bulged portion; and (j) joining the annular collar portion to the first bulged portion and the second bulged portion.

The subject invention further provides an apparatus for bulging polymer-lined pipe comprising:

(a) a hydraulic pull cylinder comprising a pull rod, the hydraulic pull cylinder being attached to a plate, the pull rod extending through the plate;

(b) a first die having an opening through which the pull rod extends, the die having a first recessed circular portion, such that a pipe segment may be centered within the first recessed circular portion;

(c) an annular piece of elastomeric material, the pull rod extending therethrough, (d) means for retaining the elastomeric material onto the pull rod;

(e) a second die having an opening through which the pull rod extends, the second die having a second recessed circular portion, such that a pipe segment may be centered within the second recessed circular portion; and (f) means for retaining the first die in contact with the second die.

The subject invention further provides a process for bulging polymeric-lined pipe comprising:

(a) positioning a pipe segment having a polymeric liner within a die assembly having a recessed circular portion into which an end of the pipe segment and corresponding end of the polymeric liner may be directed;

(b) providing deforming means for deforming the end of the pipe segment within the die assembly; and (c) applying force to the deforming means, whereupon the end of the pipe segment and the corresponding end of the polymeric liner may be directed into the recessed circular portion, forming a bulged end.

These and other features of the invention will be more fully set forth in the following detailed description wherein.

The subject invention provides a process for preparing a flangeless pipe joint for plastic-lined process piping. In particular, the subject invention provides a process for preparing a flangeless pipe joint for loose-lined, interference fit, or swaged piping systems.

Figure 1:
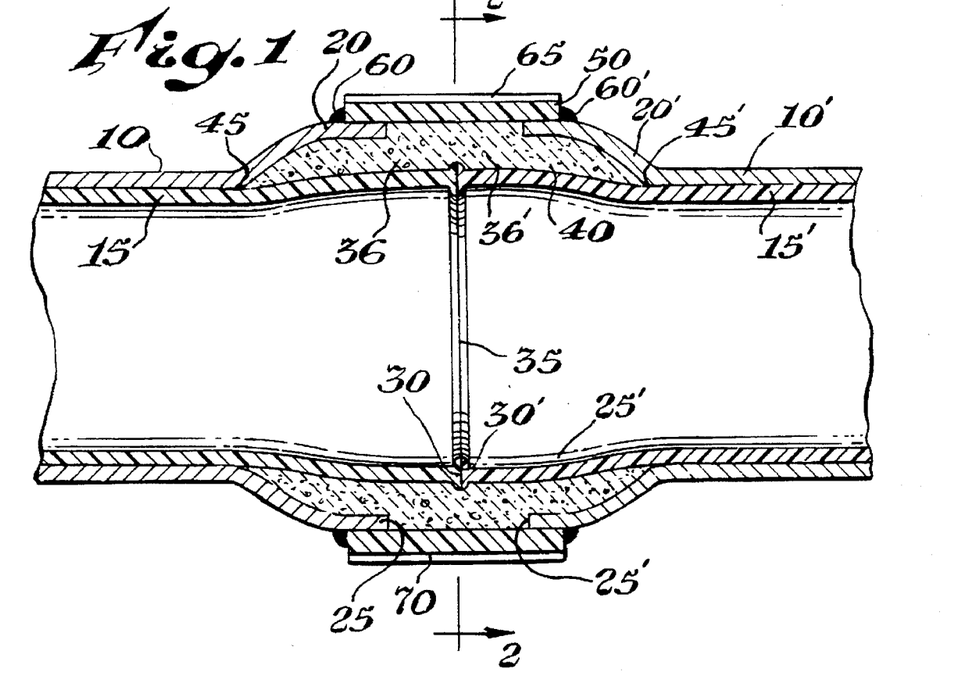
FIG. 1 is a sectional view of a pipe connection of the subject invention.
Figure 2:
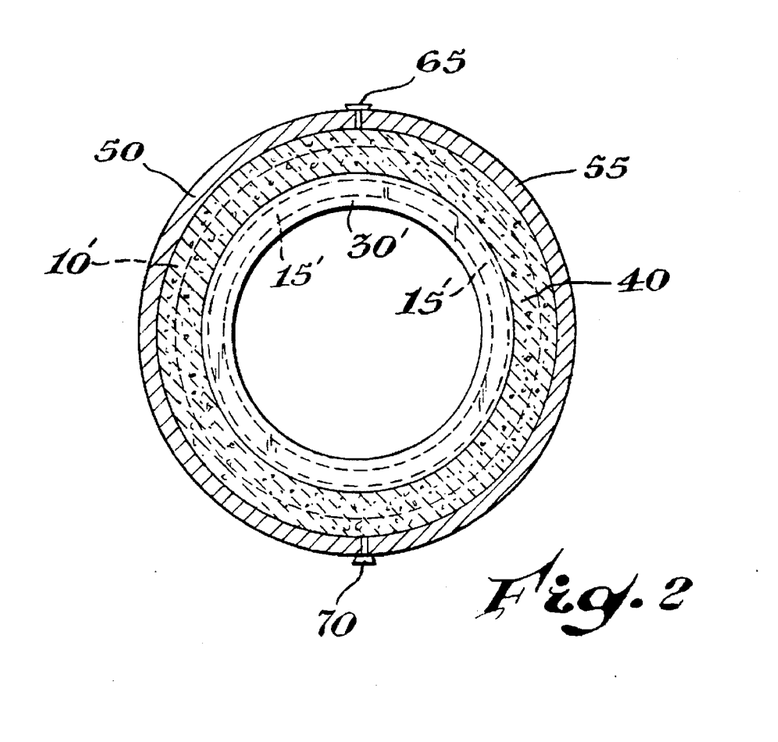
FIG. 2 is a cross sectional view of the pipe connection of FIG. 1 taken along line 2—2.

Presented for the purpose of illustration rather than limitation, FIGS. 1 and 2 set forth a particular embodiment of the subject invention. Therein, common reference numerals refer to common components.

Adjacent pipe segments 10 and 10' are lined with polymeric liners 15 and 15', respectively. While the FIGURES depict a system wherein a zero tolerance fit exists between the pipe segments and the liners, the invention further applies to systems wherein the outer diameter of polymeric liners 15 and 15' are greater than about 97 percent that of the inner diameters of pipe segments 10 and 10', respectively. Pipe segments 10 and 10' are in part defined by bulged portions 20 and 20', and bulged ends 25 and 25', respectively Polymeric liners 15 and 15' are in part defined by liner ends 30 and 30', respectively. Liner ends 30 and 30' are joined by joining means 35, e.g., a weld bead.

Joinder of the liner ends creates annular gaps 36 and 36' in part defined by liners 15 and 15' and bulged ends 25 and 25'. As depicted in FIG. 1, the annular gaps are contiguous, and essentially constitute one large annular gap. Insulating material 40 is provided such as to substantially fill annular gaps 36 and 36', covering the exposed portions of liners 15 and 15', extending from point 45 to point 45'.

Two shell-like pieces 50 and 55 are provided in contact with bulged portions 20 and 20' such as to form an annular collar portion which covers exposed insulating material 40. Pieces 50 and 55 are welded to bulged portions 20 and 20' by welds 60 and 60', respectively. Pieces 50 and 55 are welded together by welds 65 and 70. Preferably the annular collar portion will comprise metal, although any material which has sufficient structural integrity to protect the joint and resist damage from impact from the outside environment may be suitable.

Rather than two shell-like pieces 50 and 55, a unitary collar-like annular collar portion (not shown) may be provided, the unitary annular collar portion being slipped onto either of pipe segments 10 or 10' prior to fusion of liners 15 and 15', and slid into place after the provision of insulation over the fused liners. The unitary annular collar portion is joined to bulged portions 20 and 20' by welds along the circumferential ends of the unitary annular collar portion.

In one embodiment, the pipe connection may be fabricated in the following manner.

Pipe segments are lined with polymeric liners such that a loose-lined, an interference fit, or a swaged relationship exists between the liners and the pipe segments. Such means of lining pipe are well known in the art. Further, loose-lined, interference fit, and swaged pipe are commercially available, as set forth above.

Figure 3:
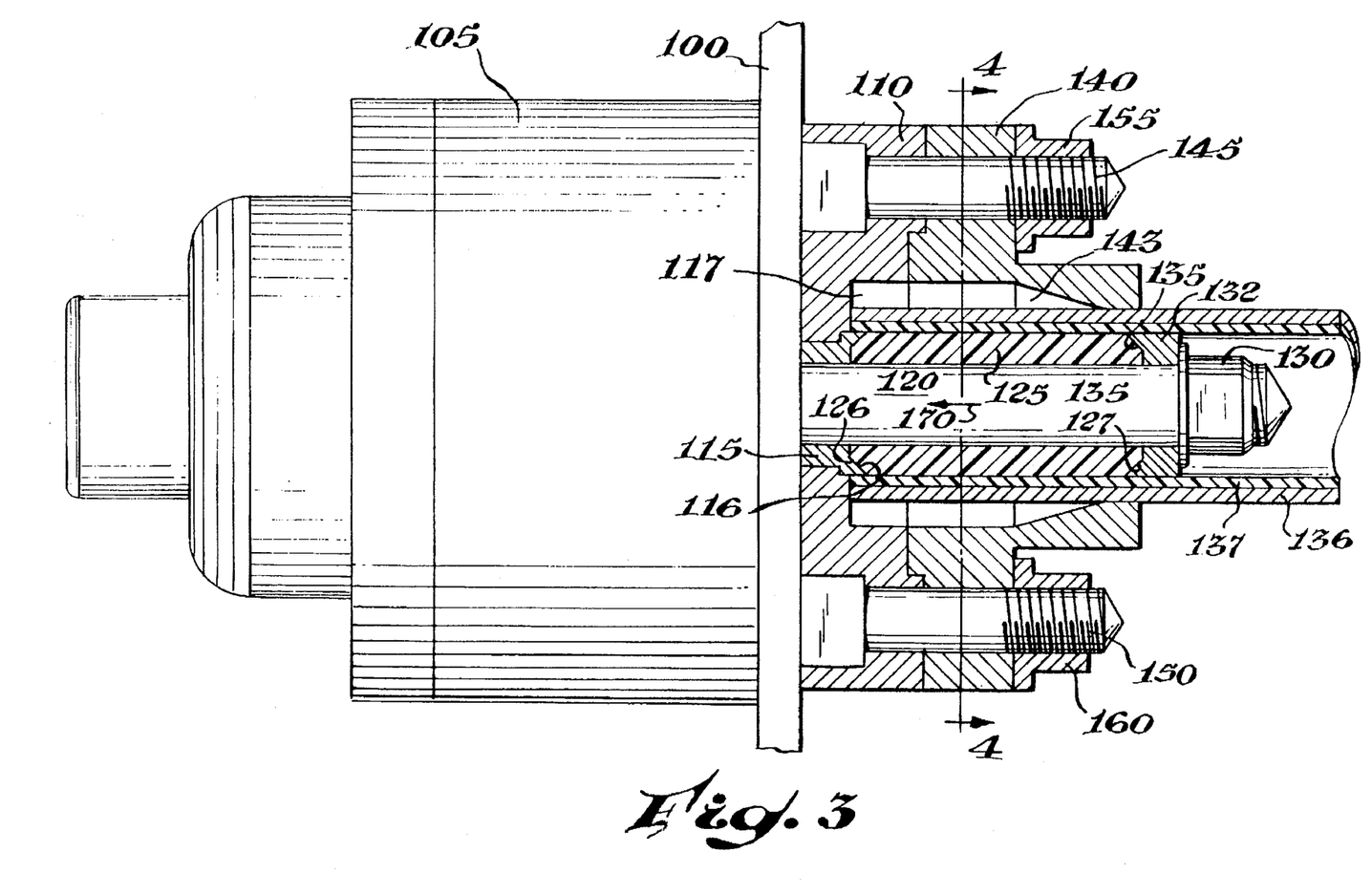
FIG. 3 is a cross sectional view of a pipe segment retained within a die for the purpose of bulging the end of the pipe segment.
Figure 4:
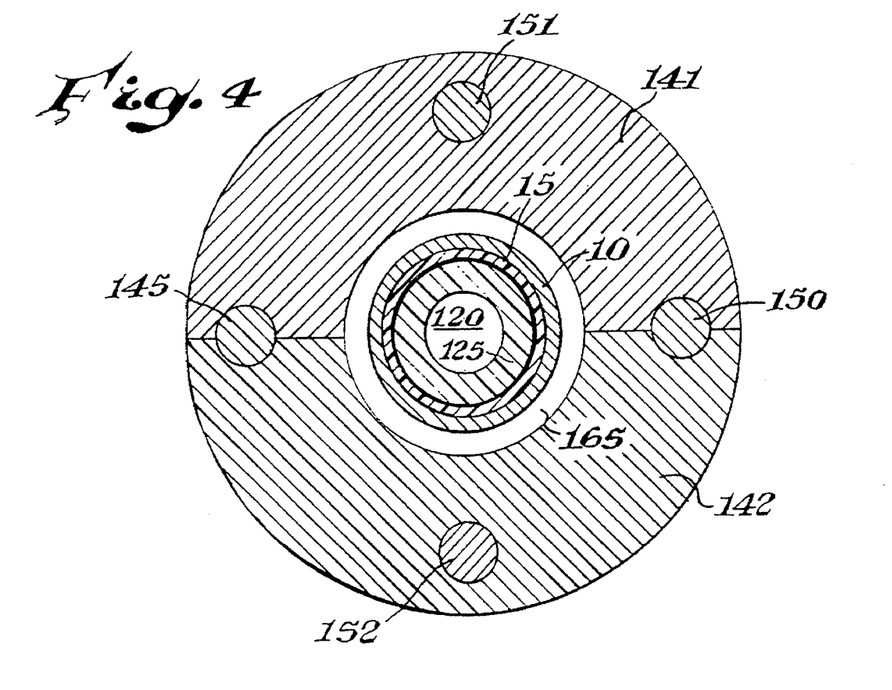
FIG. 4 is a cross sectional view of the pipe segment retained within a die of FIG. 3 taken along line 4—4.

The pipe end and the liner end of each pipe segment are bulged to form bulged portions. FIG. 3 illustrates one means for accomplishing the bulging. In particular, FIG. 3 is a cross sectional view of a pipe segment retained within a die for the purpose of bulging the end of the pipe segment. FIG. 4 is a cross sectional view of the pipe segment retained within a die of FIG. 3, taken along line 4—4. Reference numerals common to FIGS. 3 and 4 refer to common parts.

A plate 100 is bolted to a hydraulic pull cylinder 105 by bolts (not shown). A first die 110 is provided upon plate 100, with a bushing 115 interposed therebetween. Bushing 115 has a depressed face 116. First die has a first recessed circular portion 117 such that a pipe segment may be centered therein. Hydraulic pull cylinder 105 is provided with a pull rod 120. Pull rod 120 extends through bushing 115 and through first die 110. An annular piece of elastomeric material 125 is provided onto pull rod 120 which extends therethrough, and is retained on pull rod 120 by nut 130 and washer 132. Washer 132 has a depressed face 135 Elastomeric material 125 has a chamfered faces 126 and 127 to align with depressed faces 116 of bushing 115 and 135 of washer 132. Bushing 115 and washer 132 will preferably be made of a material resistant to deformation during activation of the pull rod (described below) One suitable material is steel.

Pipe segment 136, lined with polymeric liner 137, is provided upon pull rod 120 and elastomeric material 125. Optionally, a mold release agent is provided upon the inner surface of liner 137 prior to provision upon pull rod 120 and elastomeric material 125. One suitable mold release compound is Sprits Mold Release compound, available from Sprits Corporation (Melville, N.Y.)

A second die 140, consisting of two halves 141 and 142, is provided upon first die 110. Second die 140 has a second recessed circular portion 143 which aligns with first recessed circular portion 117. Second die 140 and first die 110 are bolted to plate 100 by bolts 145 and 150 and accompanying clamping nuts 155 and 160. Likewise, bolts 151 and 152 are provided, with accompanying clamping nuts (not shown).

Hydraulic pull cylinder 105 is activated. Pull rod 120 moves in the direction of arrow 170, compressing the piece of elastomeric material 125 into polymeric liner 137 and pipe segment 136. The compressive force is great enough to exceed the yield value of the steel of pipe segment 136, pushing polymeric liner 137 and pipe segment 136 into first recessed circular portion 117 and second recessed circular portion 143, resulting in a bulged portion. The compressive force is applied until pull rod 120 travels a predetermined distance or until the piece of elastomeric material 125 is subjected to a predetermined pressure. In particular, the compressive force should not be so great as to permanently deform or destroy the piece of elastomeric material 125. Typical hydraulic line pressures are greater than about 3000 psi (20 megapascals), more preferably greater than about 4000 psi (30 megapascals). Typical compressive forces are less than about 10,000 psi (70 megapascals), more typically less than about 6000 psi (40 megapascals).

Elastomeric material 125 may comprise any material suitable to bulge the pipe in the desired manner without destroying the liner. Several suitable types of elastomeric materials include polyurethane, natural rubber, etc. One particular elastomeric material is a 95 A Durometer Acushnet urethane, available from Acushnet Corporation, Rubber Division (New Bedford, Mass.). Another particular 95 A durometer urethane material is available from Exotic Rubber (Freeland, Mich.).

After bulging is complete, hydraulic pull cylinder 105 is turned off, releasing the pressure on the piece of elastomeric material 125. In addition, or in the alternative, hydraulic pull cylinder 105 may be directed to cause pull rod 120 to move in a direction opposite to that of arrow 170. When the piece of elastomeric material 125 has been moved to its noncompressed position, second die 140 is removed, and pipe segment 136 released.

While the above description of bulging refers to a hydraulic pull cylinder to compress a piece of elastomeric material, one skilled in the art will appreciate that systems utilizing a purely hydraulic force, an explosive force, or a mechanical force may likewise be designed. In such a system no elastomer material will typically be required. In such a system, the end of pipe segment 136 will typically be sealed from the environment. The hydraulic, explosive, or mechanical force will then directly bulge the pipe end into recessed portions 117 and 143.

To permit bulging, the pipe segment shall comprise a flarable metal. In the case of flarable steel, the steel will have an elongation factor of at least 40 percent, such as steel specified by ASTM A-587. Other flarable metals may also be employed.

In the case of 2 inch (5 cm) outer diameter lined pipe, to avoid damaging the steel pipe, the bulging will preferably result in a bulged portion having a maximum outer diameter less than about 3 inches (7.6 cm). However, to permit the provision of insulation between the outer surface of the liner and the inner surface of the pipe, the bulged portion will have a maximum outer diameter which is greater than about 2¼ inches (5.7 cm), more preferably greater than about 2½ inches (6.4 cm), most preferably greater than about 2¾ inches (7.0 cm). A maximum bulged diameter of about 2⅞ inches (7.3 cm) is preferred.

Each pipe segment is cut near the pipe end exclusive of the liner, preferably at the point of the bulged portion of the pipe segment having a maximum outer diameter. Devices for cutting through the pipe segment without damaging the liner are available from pipe machine manufacturers, such as Wheeler Manufacturing Corporation, (Ashtubula, Ohio), Ridgid (Elyria, Ohio) and Tri Tool (Rancho Cordova, Calif.). Each annular portion is removed exclusive of the liner. Thus, the liner extends beyond the remaining bulged portion of each pipe segment.

Depending upon the original dimensions of the liner, annealing may be required to straighten the liner, wherein the memory of the plastic returns the liner substantially to its original extruded diameter. In the case of swaged pipe, the liner within the bulged portion of the pipe will have an outer diameter greater than that in the non-bulged portion of the pipe (as the swaged liner has a smaller outer diameter than the pre-swaging extruded liner). In certain cases, should the liner not be annealed, the liner would relax during welding, causing distortion of the joint during subsequent fusion of adjacent liner sections. Typically, annealing is required when the polymeric liner comprises any thermoplastic material. Annealing may be accomplished by heating the polymer to its glass transition temperature. For instance, a hot air gun may be used to heat bulged polypropylene-lined steel pipe to about 120° C. Moreover, during annealing, the pipe may be rotated to promote uniform application of heat.

In the case of 2 inch (5 cm) outer diameter lined pipe, upon annealing the bulged liner, a maximum annular gap between the outer surface of the liner and the inner surface of the pipe of the bulged end will be at least about ⅛ inch (0.3 cm), more preferably at least about 5132 inch (0.4 cm), most preferably at least about ¼ inch (0.6 cm). The maximum size of the gap will be determined by the maximum outer diameter of the pipe in the bulged end. In general, the maximum annular gap will be less than about ⅝ inch (1.6 cm).

Adjacent liner ends are joined by means known in the art. Such means include, but are not limited to, e.g., butt fusion welds, fillet welds, socket welds, solvent welds, ultrasonic welds, vibratory welds, electrofusion, and adhesives. Depending upon the type of joinder means employed, it may be advantageous to trim the liner ends to form more uniform joining surfaces and/or to reduce the degree to which the liner extends past the bulged end.

One particularly preferred joinder means is butt fusion welding. A suitable apparatus for butt fusion welding adjacent polymeric liners is described in U.S. Pat. No. 4,352,708, the relevant portions of which are incorporated herein by reference. Another suitable apparatus for butt fusion welding adjacent polymeric liners is available from Omicron, S.N.C. (Caselie Di Selvazzano, Italy).

In an exemplary butt fusion welding process, adjacent liner ends are pressed against a hot plate set at 210° C. (for a polyvinylidene fluoride liner) with a combined pressure of 10 psi (70 kilopascals) until a 1/32 inch (0.08 cm) bead forms on the outer circumference of the joint. The pressure is then reduced to 1 psi (6 kilopascals) for an additional 45 seconds. Then, the plate is removed by backing the adjacent liner ends away and pulling out the plate. The two heated partially melted adjacent liner ends are quickly pushed together at a pressure of 10 psi (70 kilopascals) and held together at that pressure for 20 minutes.

Another particularly preferred joinder means is fillet welding, wherein a thermoplastic filler rod is heated and the flowing material is applied to the liner ends to join them. Optionally, the liner ends will be beveled such that when they are brought together, a V-shaped annular channel is formed, the point of the V lying at the inner surface of the liner at the point of joinder. The fillet weld will be made within the V along the bevels, such that the weld bead contacts more surface area of the liner ends than if the filler rod was merely passed over the outer circumference of straight-cut liner ends.

To insulate the polymeric liner from heat present during the joinder of the bulged pipe ends, the liner is provided with an insulating material which substantially covers all exposed portions of the liner, from the point which the liner separates from the bulged ends to the point of joinder. For instance, as depicted in FIG. 1, insulating material 40 substantially fills the large annular gap which includes annular gaps 36 and 36'. In one embodiment, ceramic putty is injected to fill at least the annulus having a substantially triangular cross section, one apex of which is defined by the point at which the bulged portion meets the unbulged portion of the pipe segment, i.e., points 45 and 45' of FIG.1. The use of a ceramic putty affords the advantage of permitting insulation of the liner, even at the point at which the liner separates from the bulged end of the pipe segment. A suitable ceramic putty will resist temperatures up to about 1260° C. One suitable ceramic putty is sold by Cotronics Corporation (Brooklyn, N.Y.).

Being mostly water based, ceramic putties tend to release steam upon heating, which complicates the welding of the annular metal piece(s) which may join the bulged portions. Accordingly, in one preferred embodiment, the annular metal piece(s) will be welded to the bulged ends in stages, with the joint being permitted to cool between stages. For instance, a first weld bead may be applied to one-third of the circumference of the annular metal piece(s); a second weld bead may be applied to one-third of the circumference of the annular metal piece(s) at a position 180° opposite the first weld bead; a third weld bead may connect the first and the second weld beads; and a fourth weld bead may complete the connection of the weld beads around the circumference of the annular metal piece(s), with the joint being cooled between the application of each successive weld bead.

In another preferred embodiment, the ceramic putty will be used to fill only the regions which are difficult to fill with a solid material; the remaining regions will preferably be covered with ceramic paper. In particular, after injection of ceramic putty into the desired regions, ceramic paper is wrapped around the exposed portion of the polymeric liner to a thickness of at least about one-eighth inch (0.3 cm.), preferably to a thickness of at least about one-fourth inch (0.6 cm.). As ceramic papers do not contain water, they minimize the amount of steam which would be released during welding. A suitable ceramic paper will resist temperatures up to about 1260° C. One suitable ceramic paper is sold by The Carborundum Company (Niagara Falls, N.Y.) as Fiberfrax 550 Paper.

To inhibit transfer of the heat of welding along the pipe to the non-bulged portion of the pipe, a heat sink compound is applied annularly around the pipe at a point intermediate the weld site and the non-bulged portion of the pipe. Suitable heat sink compounds are commercially available and are well known in the art. On particular heat sink compound is Anti-Heat heat sink compound available from Big Three Industries, Tempil Division (South Plainfield, N.J.). Indeed, in some applications, cold wet cloths may simply be wrapped around the pipe at a point intermediate the weld site and the non-bulged portion of the pipe to dissipate the heat.

While the invention has been described in terms of insulating the weld site, and subsequently welding the unitary annular collar portion to the two bulged portions, in another embodiment, the unitary annular collar portion will be provided with a fill hole. Prior to insulation, or after partial insulation, the unitary annular collar portion may be slid into place. Ceramic putty may be backfilled through the fill hole into the annular gaps 36 and 36' of FIG. 1. Welding may then be accomplished, and the fill hole closed, e.g., by an additional weld bead.

Figure 5:
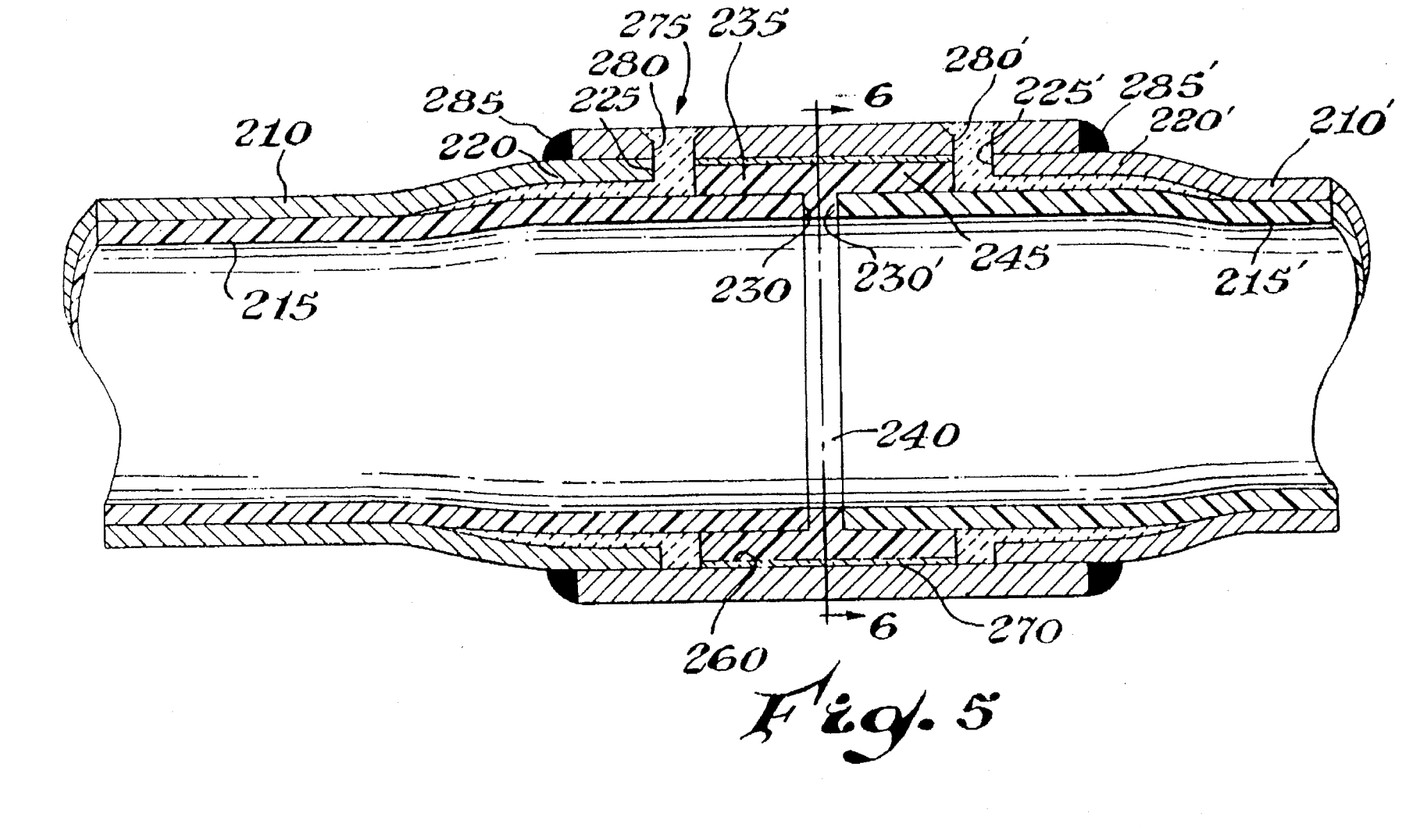
FIG. 5 is a sectional view of an alternate pipe connection of the subject invention which utilizes a polymeric coupling.
Figure 6:
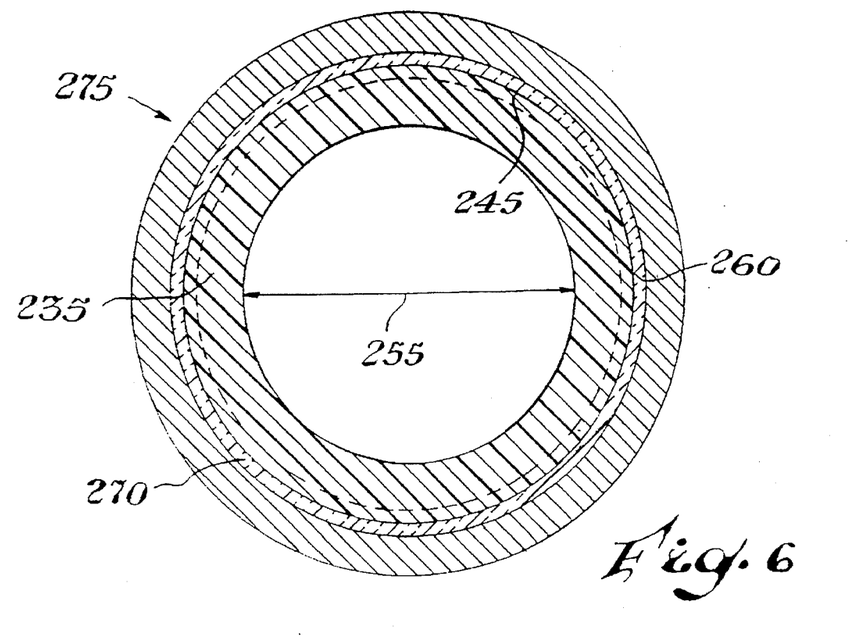
FIG. 6 is a sectional view of the pipe connection of FIG. 5, taken along line 6—6.

FIG. 5 is a sectional view of an alternate pipe connection of the subject invention which utilizes a polymeric coupling 235. FIG. 6 provides a sectional view of the pipe connection of FIG. 5 taken along line 6—6. As between FIGS. 5 and 6, common reference numerals refer to common parts.

Pipe segments 210 and 210' are lined with polymeric liners 215 and 215', respectively. Pipe segments 210 and 210' are in part defined by bulged portions 220 and 220', and bulged ends 225 and 225', respectively. Polymeric liners 215 and 215' are in part defined by liner ends 230 and 230', respectively.

Polymeric coupling 235 is interposed between liner ends 230 and 230' as a part of the joining means. Polymeric coupling 235 has a first annular portion 240 and a second annular portion 245. First annular portion 240 has an inner diameter 255 which is greater than or equal to the inner diameters of polymeric liners 215 & 215'. Preferably, inner diameter 255 will equal the inner diameters of polymeric liners 215 & 215'. Polymeric liners 215 and 215' abut against first annular portion 240. Second annular portion 245 wraps around polymeric liners 215 and 215', and has an outer surface 260. Polymeric coupling 235 is joined to polymeric liners 215 and 215' by suitable joinder means, such as socket welding or electrofusion.

An annular collar portion 275 is slipped in place over insulating material 270. Annular collar portion 275 is provided with fill holes 280 and 280' extending to the regions defined by bulged portions 220 and 220' and polymeric liners 215 and 215'. Ceramic putty is injected into holes 280 and 280' to substantially fill the regions defined by bulged portions 220 and 220' and polymeric liners 215 and 215'. Annular collar portion 275 is secured to pipe segments 210 and 210' by, e.g., fillet welding at points 285 and 285', respectively. Holes 280 and 280' are covered by any suitable means, e.g., by a weld bead.

In another embodiment, the ceramic paper/putty combination of insulating material described above may be employed, rather than exclusively ceramic putty. In this case, the annular collar portion 275 may be replaced with the annular metal piece(s) described above with respect to FIGS. 1 and 2.

In one embodiment, the resultant flangeless pipe joint will be retained within a secondary containment system. A secondary containment system surrounds the primary piping system, including the flangeless joints of the invention, and serves as an added barrier between the flangeless joints and the outside environment. In some cases, secondary containment systems are provided to limit the effect of failure at the joint. In some cases, secondary containment systems are provided to collect fugitive emissions through the joint, with appropriate conduits connecting adjacent devices for transportation to a collection vessel. In some cases, secondary containment systems will contain a sensor to monitor emissions through the joint. The subject invention affords the advantage of providing a smaller diameter joint for enclosure within such a device, as compared to corresponding flanged joints. Particular examples of secondary containment systems are available from Midwesco (Niles, Ill.) under the tradename Perm Alert ESP, and from George Fischer Signet, inc. (Tustin, Calif.).

While the subject invention has been described in terms of sliplined, interference fit, and swaged process pipe segments, it will be recognized that the invention further applies to injection molded pipe fittings, such as ells, tees, wyes, etc. In this case, the term "second section of pipe" will include linear sections of pipe, as well as, e.g., fittings. Due to their typically nonlinear configurations, fittings are typically formed by turning individual units and joining the turned units to form the desired configuration, e.g., by welding. Thus, two units are joined to form elbows, three units are joined to form both tees and wyes, and four units are joined to form crosses. Once joined, one or more dies are inserted into the fitting. The fitting is then lined by injecting the liner material into the region defined by the interior surface of the fitting and the die(s).

In order the maximize the benefits of the subject invention, fittings will preferably be provided with bulged ends which will align with those of the pipe segments to which they will be joined. Bulging of the ends of the fittings will most easily be accomplished by turning the individual units of which the fitting is comprised, such that each individual unit is formed with a bulged end. The bulged individual units will be assembled in the usual manner to form bulged fittings. One or more dies may be inserted within the bulged fitting The dies may be designed to form the portion of the polymeric liner which extends beyond the bulged end. In the alternative, a portion of the bulged ends of the fitting may be removed, exclusive of the liner. The liner end may then be joined to an adjacent liner end, the joint may be insulated, and a shell may be provided to cover the insulation and join the fitting to the adjacent pipe segment, in the manner set forth above.

Moreover, the subject invention has been described such that the pipe segment in question is pre-lined, whereupon the end of the pre-lined pipe segment is subsequently bulged. However, in the case of sliplined and interference fit pipe segments, the pipe segments may be first bulged and subsequently lined, without sacrificing the benefits of the subject invention.

Other embodiments of the invention described above will be readily apparent to those having skill in the art. Accordingly, the scope of the invention shall be limited only by the claims appended hereto.

We claim:

1. A flangeless pipe joint for polymer-lined pipe comprising:

(a) a first section of pipe in part defined by a first portion having a first inner diameter and a first bulged portion having a first bulged end, the first bulged end having a second inner diameter at the first bulged end, the second inner diameter being greater than the first inner diameter, the first section of pipe being lined with a first polymeric liner having a first polymeric liner end and first outer diameter such that the first outer diameter is at least about 97 percent of the first inner diameter, the first polymeric liner end extending beyond the first bulged end;

(b) a second section of pipe in part defined by a second portion having a third inner diameter and a second bulged portion having a second bulged end, the second bulged end having a fourth inner diameter, the fourth inner diameter being greater than the third inner diameter, the second section of pipe being lined with a second polymeric liner having a second polymeric liner end and a second outer diameter such that the second outer diameter is at least about 97 percent of the second inner diameter, the second polymeric liner end extending beyond the second bulged end;

(c) first joining means for joining the first polymeric liner end to the second polymeric liner end whereupon a first annular gap and a second annular gap are created, the first annular gap being defined by the first polymeric liner, the first bulged portion, and the joining means, and the second annular gap being defined by the second polymeric liner, the second bulged portion, and the joining means;

(d) insulating material substantially filling the first annular gap and the second annular gap;

(e) an annular collar portion which extends from the first bulged portion to the second bulged portion; and (f) second joining means for joining the annular collar portion to the first bulged portion and the second bulged portion.

2. The flangeless pipe joint of claim 1 wherein said thermoplastic liner is a polymer selected from the group consisting of polyvinylidene chloride, polytetrafluoroethylene, perfluoroalkoxy copolymer, and fluorinated ethylene-propylene copolymer.

3. The flangeless pipe joint of claim 1, wherein the relationship between the first polymeric liner and the first section of pipe is selected from the group consisting of interference fit, swaged, and loose-lined, and the relationship between the second polymeric liner and the second section of pipe is selected from the group consisting of interference fit, swaged, and loose lined.

4. The flangeless pipe joint of claim 1, wherein the insulating material is a material selected from the group consisting of ceramic paper, ceramic putty, and a combination thereof.

5. The flangeless pipe joint of claim 1, wherein the first joining means comprises a weld bead, whereupon the first annular gap is contiguous with the second annular gap.

6. The flangeless pipe joint of claim 1, wherein the first joining means comprises a polymeric coupling having a first annular portion and a second annular portion, the first annular portion being positioned between the first polymer liner and the second polymer liner, the second annular portion encircling both the first polymer liner, the first annular portion, and the second polymer liner.

7. The flangeless pipe joint of claim 1, wherein the annular collar portion is joined to the first bulged portion such that the annular collar portion overlaps the first bulged end.

8. The flangeless pipe joint of claim 7, wherein the annular collar portion is joined to the first bulged portion at the point of the bulged portion having the greatest outer diameter.

9. The flangeless pipe joint of claim 1, wherein such joint is surrounded by a secondary containment system, such that the secondary containment system is positioned between the pipe joint and an outside environment.

10. The flangeless pipe joint of claim 9, wherein the secondary containment system is equipped with a sensor for detecting leaks of materials passing through the pipe at the pipe joint and into the secondary containment system.

11. A process for preparing a flangeless pipe joint for polymer-lined pipe comprising:

(a) providing a first section of pipe in part defined by a first portion having a first inner diameter, the first section of pipe being lined with a first polymeric liner having a first polymeric liner end and a first outer diameter such that the first outer diameter is at least about 97 percent of the first inner diameter;

(b) bulging the first section of pipe to form a first bulged portion having a first bulged end, the first bulged end having a second inner diameter, the second inner diameter being greater than the first inner diameter;

(c) cutting the first bulged portion exclusive of the first polymeric liner, whereupon the first polymeric liner end extends beyond the first bulged end;

(d) providing a second section of pipe in part defined by a second portion having a third inner diameter, the second section of pipe being lined with a second polymeric liner having a second polymeric liner end and a second outer diameter such that the second outer diameter is at least about 97 percent of the third inner diameter;

(e) bulging the second section of pipe to form a second bulged portion having a second bulged end, the second bulged end having a fourth inner diameter, the fourth inner diameter being greater than the third inner diameter;

(f) cutting the second bulged portion exclusive of the second polymeric liner, whereupon the second polymeric liner end extends beyond the second bulged end;

(g) joining the first polymeric liner end to the second polymeric liner end, whereupon a first annular gap and a second annular gap are created, the first annular gap being defined by the first polymeric liner, the first bulged portion, and the joining means, and the second annular gap being defined by the second polymeric liner, the second bulged portion, and the joining means;

(h) filling the first annular gap and the second annular gap with insulating material;

(i) providing an annular collar portion which extends from the first bulged portion to the second bulged portion; and (j) joining the annular collar portion to the first bulged portion and the second bulged portion.

12. The process of claim 11, wherein the first or the second polymeric liner is a polymer selected from the group consisting of polyvinylidene fluoride, polypropylene, polyvinylidene chloride, polytetrafluoroethylene, perfluroalkoxy copolymer, and fluorinated ethylenepropylene copolymer.

13. The process of claim 11, wherein the relationship between the first polymeric liner and the first section of pipe is selected from the group consisting of interference fit, swaged, and loose-lined, and the relationship between the second polymeric liner and the second section of pipe is selected from the group consisting of interference fit, swaged, and loose-lined.

14. The process of claim 11 which further comprises (i) annealing the first polymer and second polymer end, said annealing occuring between the cutting of steps (f) and the joining of step (g).

15. The process of claim 11, wherein the insulating material is a material selected from the group consisting of ceramic paper, ceramic putty, and a combination thereof.

16. The process of claim 11, wherein the joining comprises welding or fusing the first polymeric liner end to the second polymeric liner end, whereupon the first annular gap is contiguous with the second annular gap.

17. The process of claim 11, wherein the joining of step (g) comprises:

i) inserting a polymeric coupling between the first polymeric liner end and the second polymeric liner end, the polymeric coupling comprising a first annular portion being positioned between the first polymer liner end and the second polymer liner end, and a second annular portion encircling the first polymer liner end, the first annular portion and the second annular polymer liner end; and ii) joining the polymeric coupling to the first polymeric liner and the second polymeric liner.

18. The process of claim 17, wherein the polymeric coupling is joined to the first polymeric liner and the second polymeric liner by socket welding.

19. The process of claim 11, wherein the annular collar portion is joined to the first bulged portion such that the annular collar portion overlaps the first bulged end.

20. The process of claim 11, wherein the annular collar portion is joined to the first bulged portion at the point of the bulged portion having the greatest outer diameter.

21. The process of claim 11, wherein, such joint is surrounded by a secondary containment system, such that the secondary containment system is positioned between the pipe joint and an outside environment.

22. The process of claim 21, wherein the secondary containment system is equipped with a sensor for detecting leaks of materials passing through the pipe at the pipe joint and into the secondary containment system.

* * * * *